United States Patent [19]

Niemzig

[11] Patent Number: 4,889,628

[45] Date of Patent: Dec. 26, 1989

[54] BELT-LOADING ROLLER ARRANGEMENT FOR THE HIGH PRESSURE REGION IN BELT-FILTER PRESSES

[75] Inventor: Hajo Niemzig, Pforzheim, Fed. Rep. of Germany

[73] Assignee: Mei Tai Co., Ltd., Taipei, Taiwan

[21] Appl. No.: 209,567

[22] Filed: Jun. 21, 1988

Related U.S. Application Data

[63] Continuation-in-part of Ser. No. 917,157, Oct. 9, 1986, abandoned.

[30] Foreign Application Priority Data

Oct. 10, 1985 [DE] Fed. Rep. of Germany ... 8528848[U]

[51] Int. Cl.$^4$ ........ B01D 33/04

[52] U.S. Cl. ........ 210/386; 100/120; 210/400

[58] Field of Search ........ 100/116, 117, 118, 119, 100/120, 121, 153; 210/358, 386, 400, 401, 402

[56] References Cited

U.S. PATENT DOCUMENTS

| | | | |
|---|---|---|---|
| 3,527,668 | 10/1966 | Kusters et al. | 162/272 |
| 3,530,791 | 9/1970 | Flotte | 100/120 |
| 3,743,100 | 7/1973 | Bähr | 210/386 |
| 3,896,030 | 7/1975 | Bähr | 210/384 |
| 4,071,925 | 2/1978 | Folk | 19/296 |
| 4,475,453 | 10/1984 | Davis | 110/118 |

FOREIGN PATENT DOCUMENTS

| | | | |
|---|---|---|---|
| 57-79099 | 5/1982 | Japan | 100/120 |
| 1117229 | 10/1984 | U.S.S.R. | 100/120 |

*Primary Examiner*—W. Gary Jones
*Assistant Examiner*—Matthew O. Savage
*Attorney, Agent, or Firm*—Spencer & Frank

[57] ABSTRACT

A belt-loading roller arrangement, in particular for a high-pressure region in belt-filter presses, comprising at least one belt-loading roller which is embraced over part of its circumference by two bands for enclosing a stock to be pressed. The peripheral roller surface is formed of a plurality of cylinder section surfaces, which diameters are smaller than that of the roller.

22 Claims, 4 Drawing Sheets

BELT-LOADING ROLLER ARRANGEMENT FOR THE HIGH PRESSURE REGION IN BELT-FILTER PRESSES

CROSS REFERENCE TO RELATED APPLICATION

This application is a continuation-in-part of application Ser. No. 06/917,157 filed Oct. 9th, 1986, now abandoned.

BACKGROUND OF THE INVENTION

This invention relates to a belt-loading roller arrangement, in particular for a high-pressure region in belt-filter presses, comprising at least one belt-loading roller which is embraced over part of its circumference by two belts for enclosing a stock to be pressed.

It is known to apply high pressure to the cake of suspension for the dewatering process by means of filter-presses. Most process, however, demand continuous action such that high pressures may be applied to the cake for a longer period. In paper industry, the known nip rollers are frequently used for the dewatering of paper sludge. "Nip roller system" used in this industry refers to a kind of roller arrangement wherein the rollers may press against one another by appropriate pressing means. Though the nip roller system may provide a high pressure, it acts only for a short period. Normally, the belt-filter presses, especially those used for the dewatering of the sludge cake, adopt the "nip roller system" for merely 5% of the overall process. The reason is that most of the suspensions are too soft to take the high pressure exerted by the nips of respective rollers. The suspension tend to pass through the meshes of the filter belt and squeeze out from the sides of the same.

In an article presented to the Water Pollution Control Federation at the 54th annual conference, Mr. Peterson listed a number of physical and mechanical parameters for belt-filter press. He found that the pressure mainly depends on: (i) the elasticity of the belts, ii) the roller diameter, (iii) the distance between the belts, (iv) the tensioning of the belts, and (v) the thickness of the cake. He thus derived the equation:

$$P=2T/D$$

where P=pressure to the cake; T=tensioning of the belt and D=roller diameter.

From the equation, it can be seen that pressure increase can be obtained by some combination of increased belt tension (T) and/or decreased roller diameter (D). It should be noted that belt tension arises from three sources, that is:

(a) tension due to drive torque: $F_1$ (b) tension due to take-up: $F_2$ (c) tension due to belt elasticity: $F_3$, and the tension due to belt elasticity is much greater than (a) or (b) above.

Drive torque produces the belt tension required to pull the belt through the press. It is maximum immediately before the drive rolls and may be assumed to decrease linearly through the machine to zero immediately after.

Take-up tension is required to prevent slack belts and to provide traction for the drive rolls. It may be assumed to be constant throughout the machine.

The outer belt circulating the pressure rolls in the press is stretched because it has a greater distance to travel from roll to roll due to the sludge thickness. Stretching the belt requires force, which applies pressure to the sludge cake. The force may be calculated by the relationship:

$$E=F_3/\epsilon$$

where E is the modulus of elasticity of the belt, and $\epsilon$ is the belt strain in inches per inch.

Regarding tension due to take-up, many designs of belt press use pneumatic or hydraulic cylinders to tension the belts. However, such method is an expensive way to produce cake pressure. It is present throughout the machine and must therefore be resisted throughout. A high $F_2$ thus requires a costly machine designed. $F_3$, on the other hand, is present only at the rolls with a cake sandwich, where it is needed, and only these rolls need be designed to resist it. $F_3$ is not present at drive, take-up, or return rolls.

SUMMARY OF THE INVENTION

An object of the invention is to improve a roller arrangement in such a way that greater pressing pressures can be achieved, while the mechanical stability of the roller is not substantially impaired.

According to the invention, there is provided a belt-loading roller arrangement comprising at least one rigid belt-loading roller, which is embraced over at least part of its circumference by two bands for enclosing a stock to be pressed, wherein a supporting surface of the bands on said at least one roller consists of a number of cylindrical surface sections, the diameters of which are smaller than the maximum diameter of the roller.

The fundamental concept of the invention is the arrangement of alternating pressure- and tangential-zones around the periphery of the roller, by which means a correspondingly higher pressure due to belt tensioning, and therefore a greater degree of drying of the pressed stock, is achieved in the pressure zones with a smaller effective diameter than the maximum diameter of the belt-loading roller itself.

Such a type of belt loading roller is particularly simple to fabricate if the cylindrical surface sections are actually sections of a tube wall which are fastened to a central core roller, for example by welding. The solution of the problem in accordance with the invention also has the advantage that the diameter of the belt loading roller is called upon for support where it is of the greatest importance, especially for the mechanical stability of the belt loading roller, and the effective diameter of the peripherally disposed tube-wall sections brings about an increase in the pressing pressure at those points.

In a further development of the invention, the cylindrical surface sections extend below the tangential zones of the bands, so that channels are formed which run parallel to the longitudinal axis of the roller. Liquid from the pressing zones can flow into these channels from both sides to be discharged at the ends of the roller.

According to a further feature of the invention, in order to increase the pressing effect and to reduce the tangential zones between the pressure zones, there may be provided at least an identically structures belt-loading roller which co-operates with the first belt-loading roller in cog-wheel fashion.

BRIEF DESCRIPTION OF THE DRAWING

An exemplified embodiment of the belt-loading roller arrangement according to the invention is described in more detail with reference to the drawings, wherein.

DESCRIPTION OF THE PREFERRED EMBODIMENT

Figure 1:
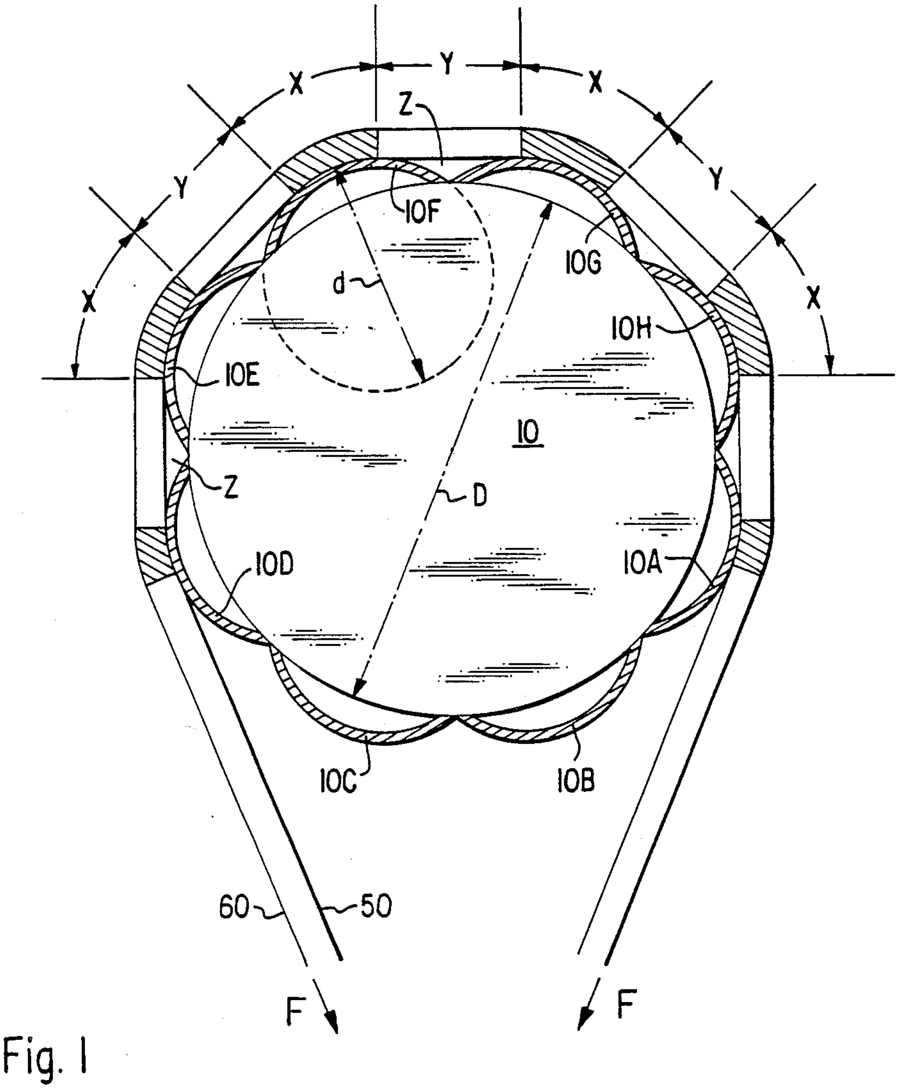
FIG. 1 shows a cross-section of a belt-loading roller arrangement according to the invention.

Turning to FIG. 1, the belt-loading roller generally designated at 1 and forming part of a filter press not shown in detail, comprises a rigid core roller 10 which can be selected in such a manner, with regard to diameter and material, that it is able to provide adequate mechanical stability against the pressure forces. Around the rigid periphery of this roller core 10, there is a plurality of tube-wall sections 10A to 10H welded onto it and the diameter d of these tube-wall sections is less than the diameter D of the core roller 10. With the rosette-like cross-section of the belt-loading roller which is built up in this manner there is an alternation of pressure zones X and tangential zones Y. High pressure is established in the pressure zones X, whereas tangential zones Y are not exposed to any pressure, resulting in a periodically squeezing of the filter cake which will stretch the filter bands 50 and 60 to thereby increase the tension force of the bands.

Figure 2:
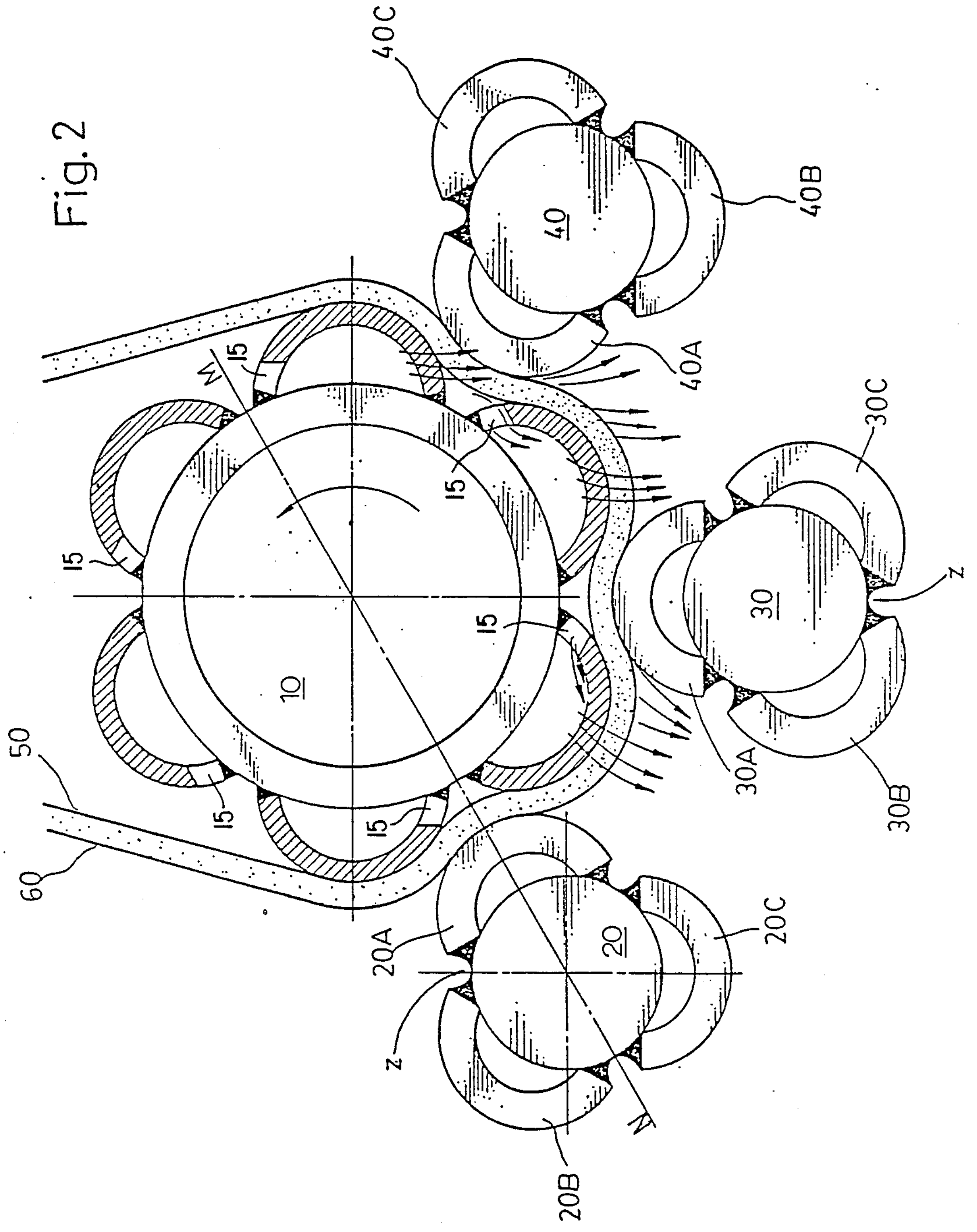
FIG. 2 is a schematic side elevational view of a belt-loading roller assembly having a primary belt-loading roller in accordance with the invention, co-operates with a plurality of secondary belt-loading rollers which are similarly constructed as the former roller but with comparatively smaller dimensions.

Beneath the tangential zones Y, discharge zones Z are formed, as a result of the receding circular cylinder sections. The filtrate liquid flows into the discharge zones Z from the adjacent pressing zones X, and may be evacuated therefrom, for example, towards the axial ends (not shown) of the core roller 10 or into the inside of the core roller 10 by passing through ports 15 (FIG. 2). The circumferential zones of the roller thus serve various purposes in mutually complementary fashion.

Even if known pressure-increasing installations, such as, for example, high-pressure bands to which pressure is applied from outside, are used, the advantages emanating from the invention can also be achieved, such as, particularly, the increase of the pressure on the filter cake.

FIG. 2 schematically illustrates a roller assembly in which a pressing effect is achieved by a co-operation between a primary belt-loading roller according to the present invention and secondary belt-loading rollers of the same construction as the former but with smaller dimensions.

As shown in the figure, the belt-loading roller 10 according to the invention embracing over part of its circumference by two filter bands 50 and 60, co-operates with three belt-loading rollers 20, 30, and 40 (hereinafter called satellite rollers), which are also designed in accordance with the invention, but with diameters comparatively smaller than that of the former roller 10. The satellite rollers 20, 30, and 40 have, on their outer surfaces, a number of circular cylinder section surfaces (20A–20C, 30A–30C, 40A–40C) of equal distance as those of the belt-loading roller 10, and are positioned, relative to the rotational axis of the belt-loading roller 10 in such a way that a connecting line M–N extends between the roller centres, through the crown of a circular cylinder section surface of the satellite rollers 20, 30, and 40, and through the evacuation zone of the belt-loading roller 10. As a result of such arrangement, the tangential regions of the primary roller 10 are reduced and the pressing regions increased such that the pressing effect is increased. Besides, the filter bands 50 and 60 circulating the belt-loading roll 10 are stretched, thereby applying increased pressure to the filter cake enclosed therein. It should be noted that the portions of the filter bands 50 and 60 which subject to increased pressure are those that come in contact with the circular cylinder section surfaces (10A–10H; 20A–20C, 30A–30C, 40A–40C) of the belt-loading roller 10 and the satellite rollers 20, 30 and 40.

Figure 3:
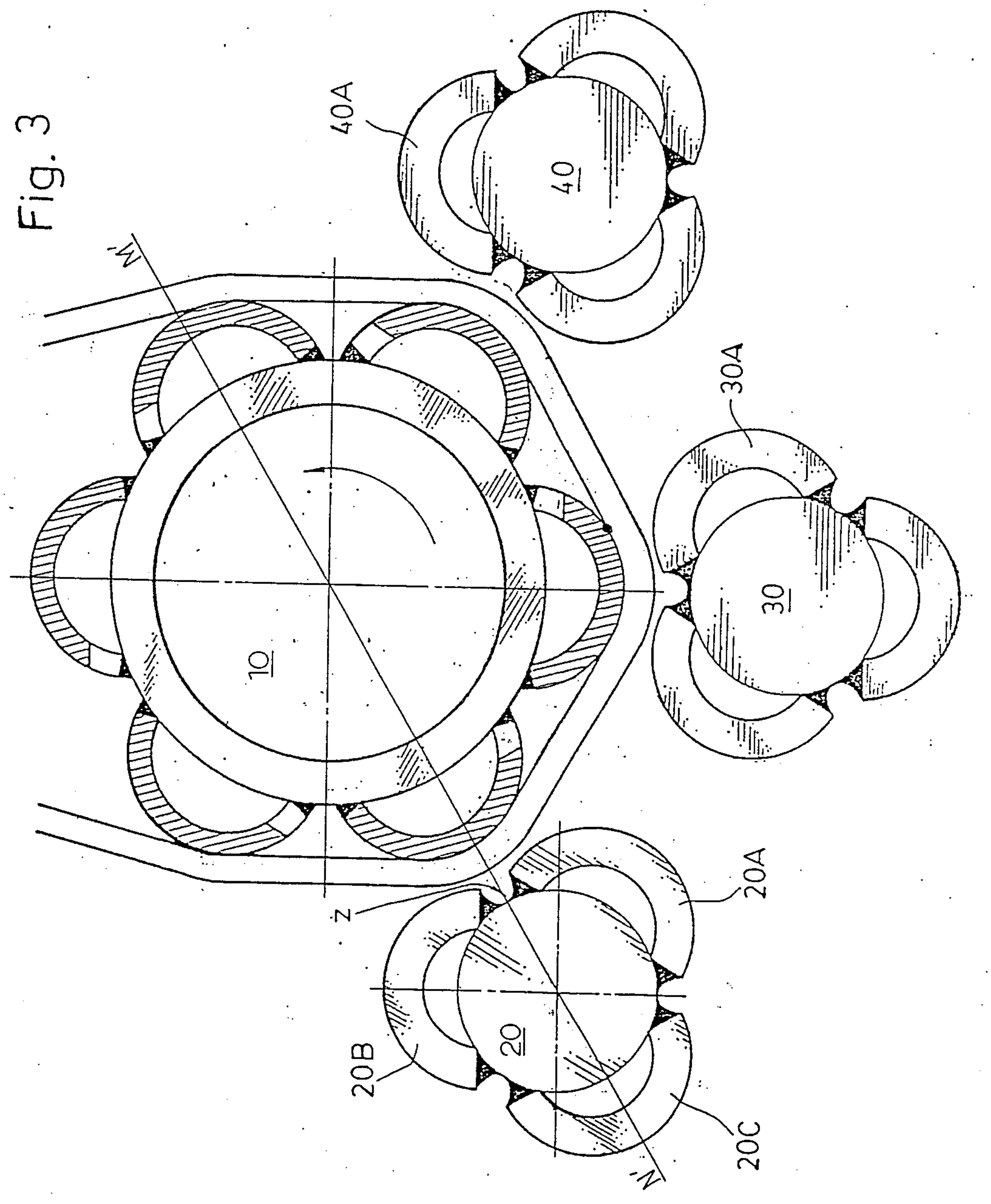
FIG. 3 illustrates another view of the roller assembly of FIG. 2, wherein the rollers have rotated a certain angle.

FIG. 3 illustrates another view of the roller arrangement of FIG. 2, wherein a connecting line M′–N′ now extends between the roller centres, through the crown of a circular cylinder section surface of the belt-loading roller 10, and through an evacuation zone of the satellite rollers 20, 30, and 40. It is clearly seen in the figure that there are clearances between the crowns of the belt-loading roller 10 and the evacuation zones of the satellite rollers 20, 30, and 40. The satellite rollers 20, 30, and 40 may preferably held for rotation about respective radially immovable axis. Such arrangement is different from that of the conventional press. The conventional press is normally provided with means for individually pressing pressure rolls against the primary roll exerting a preselected biasing force to subject the pressing stock to a relative gradual rate of increase in pressure as the pressing stock is carried into the first nip of the primary roll.

Figure 4:
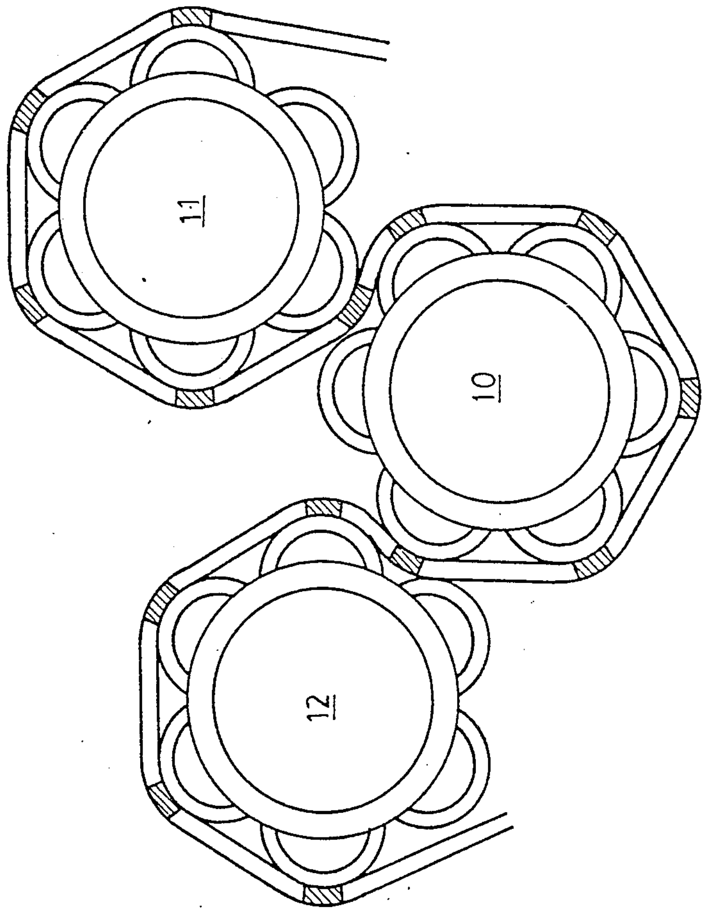
FIG. 4 is a schematic side elevational view of a further belt-loading roller assembly having at least two serially arranged belt-loading rollers according to the preferred embodiment.

FIG. 4 shows a further roller assembly in which at least two belt-loading rollers 10 and 11 according to the present invention are so arranged that a cog-wheel-like cooperation of opposed rollers takes place with a resulting relatively strong pressing effect on the pressing stock.

While it is apparent that the invention herein disclosed fulfils the objects previously described, it will be appreciated that numerous modifications and embodiments of this invention will be evident or may be devised by those skilled in the art, and it is intended that the appended claims cover all such modifications, embodiments, and all equivalents thereof, as fall within the true spirit and scope of the present invention.

What is claimed is:

1. A belt-loading roller arrangement comprising a primary belt-loading roller, which is embraced over at least part of its circumference by two bands for enclosing a pressing stock wherein a supporting surface of the bands on the primary roller consists of a number of cylinder section surfaces, the diameters of which are smaller than the maximum diameter of the primary roller, whereby the tension of the two bands will be increased as they pass around a portion of the periphery of the primary roller to thereby subject the pressing stock to a comparatively steeper rate of increase in pressure than derivable from a cylindrical pressing surface having said maximum diameter; further wherein at least one additional belt-loading roller, which comprises a plurality of cylinder section surfaces, is peripherally arranged such that the crowns thereof act on evacuation regions between the cylinder section surfaces of the primary roller to thereby subject the pressing stock to an additional increase in pressure; at least one said additional belt-loading roller being peripherally arranged such that the evacuation regions thereof are acted on by the crowns of the cylinder section surfaces of the primary roller; said at least one additional belt-loading roller being held for rotation about a radially immovable axis such that the roller is not pressed against the primary roller.

2. A belt-loading roller arrangement as claimed in claim 1, wherein the additional belt-loading roller has a diameter comparatively smaller than that of the primary roller.

3. A belt-loading roller arrangement as claimed in claim 1, wherein the diameters of the cylinder section surfaces of the additional belt-loading roller are equal to the diameters of the cylinder section surfaces of the primary roller.

4. A belt-loading roller arrangement as claimed in claim 1, wherein the cylinder section surfaces are provided by circular cylinder sections which are secured to a core roller.

5. A belt-loading roller arrangement as claimed in claim 1, wherein the additional belt-loading roller has a diameter comparatively smaller than that of the primary roller.

6. A belt-loading roller arrangement as claimed in claim 1 wherein the diameters of the cylinder section surfaces of the additional belt-loading roller are equal to the diameters of the cylinder section surfaces of the primary roller.

7. A belt-loading roller arrangement as claimed in claim 1, wherein the peripheral surfaces of the primary belt-loading roller and the additional belt-loading roller are rigid.

8. A belt-loading roller arrangement comprising a primary belt-loading roller, which is embraced over at least part of its circumference by two bands for enclosing a pressing stock wherein a supporting surface of the bands on the primary roller consists of a number of cylinder section surfaces, the diameters of which are smaller than the maximum diameter of the primary roller, whereby the tension of the two bands will be increased as they pass around a portion of the periphery of the primary roller to thereby subject the pressing stock to a comparatively steeper rate of increase in pressure than derivable from a cylindrical pressing surface having said maximum diameter; further wherein at least one additional belt-loading roller, which comprises a plurality of cylinder section surfaces, is peripherally arranged such that the crowns thereof act on evacuation regions between the cylinder section surfaces of the primary roller to thereby subject the pressing stock to an additional increase in pressure; the additional belt-loading roller being held for rotation about a radially immovable axis such that the roller is not pressed against the primary roller.

9. A belt-loading roller arrangement as claimed in claim 8, wherein the cylinder section surfaces are provided by circular cylinder sections which are secured to a core roller.

10. A belt-loading roller arrangement as claimed in claim 8, wherein the additional belt-loading roller has a diameter comparatively smaller than that of the primary roller.

11. A belt-loading roller arrangement as claimed in claim 8, wherein the diameters of the cylinder section surfaces of the additional belt-loading roller are equal to the diameters of the cylinder section surfaces of the primary roller.

12. A belt-loading roller arrangement as claimed in claim 8, wherein the peripheral surfaces of the primary belt-loading roller and the additional belt-loading roller are rigid.

13. A belt-loading roller arrangement comprising a primary belt-loading roller, which is embraced over at least part of its circumference by two bands for enclosing a pressing stock wherein a supporting surface of the bands on the primary roller consists of a number of cylinder section surfaces, the diameters of which are smaller than the maximum diameter of the primary roller, whereby the tension of the two bands will be increased as they pass around a portion of the periphery of the primary roller to thereby subject the pressing stock to a comparatively steeper rate of increase in pressure than derivable from a cylindrical pressing surface having said maximum diameter; wherein the primary roller cooperates with at least one secondary belt-loading roller in cog-wheel fashion; said at least one secondary roller being held for rotation about a radially immovable axis such that the secondary roller is not pressed against the primary roller.

14. A belt-loading roller arrangement as claimed in claim 13, wherein the cylinder section surfaces are provided by circular cylinder sections which are secured to a core roller.

15. A belt-loading roller arrangement as claimed in claim 13, wherein the peripheral surfaces of the primary belt-loading roller and the additional belt-loading roller are rigid.

16. A filter press comprising in combination:

(a) running superimposed filter bands adapted to include a pressing stock;

(b) a primary belt-loading roller held for rotation and having rigid peripheral surface formed of a plurality of circumferentially consecutive cylindrical segments each having a diameter smaller than the diameter of the primary roller, and said primary roller supporting said filter bands on said peripheral surface; and (c) a plurality of secondary rollers each held for rotation about a radially immovable axis and mounted adjacent the primary roller in circumferentially spaced relationship about said primary roller, and each having a rigid peripheral surface formed of a plurality of circumferentially consecutive cylindrical segments, the diameters of which are smaller than the diameter of said secondary roller; whereby the tension of said filter bands will be increased as they pass between said primary roller and said secondary rollers.

17. A filter press as claimed in claim 16, wherein said secondary rollers cooperate with said primary roller in cog-wheel fashion to define alternate pressure zones and tangential zones; whereby said bands are subject to high pressures in the pressure zones, but not subject to any pressure in the tangential zones, resulting in a periodically squeezing of the pressing stock included in the filter bands.

18. A belt-loading roller arrangement as claimed in claim 16, wherein the cylinder section surfaces are provided by circular cylinder sections which are secured to a core roller.

19. A belt-loading roller arrangement as claimed in claim 16, wherein the peripheral surfaces of the primary belt-loading roller and the additional belt-loading roller are rigid.

20. A belt-loading roller arrangement comprising a primary belt-loading roller, which is embraced over at least part of its circumference by two bands for enclosing a pressing stock wherein a supporting surface of the bands on the primary roller consists of a number of cylinder section surfaces, the diameters of which are smaller than the maximum diameter of the primary roller, whereby the tension of the two bands will be increased as they pass around a portion of the periphery of the primary roller to thereby subject the pressing stock to a comparatively steeper rate of increase in pressure than derivable from a cylindrical pressing surface having said maximum diameter; said primary roller cooperating with at least one secondary belt-loading roller in cog-wheel fashion; said at least one secondary roller having a dimension and construction similar to those of the primary roller; said at least one secondary roller being held for rotation about a radially immovable axis such that the secondary roller is not pressed against the primary roller.

21. A belt-loading roller arrangement as claimed in claim 20, wherein the cylinder section surfaces are provided by circular cylinder sections which are secured to a core roller.

22. A belt-loading roller arrangement as claimed in claim 20, wherein the peripheral surfaces of the primary belt-loading roller and the additional belt-loading roller are rigid.

* * * * *